United States Patent [19]

Conroy et al.

[11] Patent Number: 4,874,624
[45] Date of Patent: Oct. 17, 1989

[54] PROCESS FOR MANUFACTURING A RECONSTITUTABLE CEREAL

[75] Inventors: Francis Conroy, Thurles; John Flahavan; Edward Flahavan, both of Kilmacthomas, all of Ireland

[73] Assignee: Food and Cereal Research Limited, Waterford, Ireland

[21] Appl. No.: 242,680

[22] Filed: Sep. 9, 1988

[30] Foreign Application Priority Data

Sep. 9, 1987 [IE] Ireland ................................ 2407/87

[51] Int. Cl.$^4$ ............................................. A23L 1/168
[52] U.S. Cl. ...................................... 426/457; 426/72; 426/464; 426/511; 426/618; 426/619
[58] Field of Search ................. 426/448, 619, 620, 457

[56] References Cited

U.S. PATENT DOCUMENTS 3,887,714 6/1975 Kelly et al. ............................ 426/72
4,478,857 10/1984 Stauss ..................................... 426/72
4,497,840 2/1988 Gould et al. ......................... 426/560

*Primary Examiner*—Donald E. Czaja
*Assistant Examiner*—Evan Federman
*Attorney, Agent, or Firm*—Fleit, Jacobson, Cohn, Price, Holman & Stern

[57] ABSTRACT

Water is added to pre-steamed flaked oatlets which are then blended together for approximately 30 minutes and allowed to condition for a further period of 45 minutes. The conditioned oatlets are fed to an extruder cooker where they are subjected to frictional and shear forces which raise the temperature at the die exit to 90° C. and raise the pressure to 90 psi. At the die face the exudate has a moisture content of 18.5% by weight and it is cut into pellets having a weight of 0.1 g. The pellets are conveyed to flaking rolls where flakes are formed and dried to a moisture content of 7%. The flakes are blended with 25% by weight of the pre-steamed oatlets to form an instant water reconstitutable cereal product.

14 Claims, No Drawings

PROCESS FOR MANUFACTURING A RECONSTITUTABLE CEREAL

BACKGROUND OF THE INVENTION

1. Field of the Invention

The invention relates to a process for manufacturing a reconstitutable cereal, particularly oats.

2. Description of Prior Art

Raw de-husked oat or fractured pieces of oat such as pinhead oat may be cooked by placing the oat in a pot and boiling for ½ hour to 4 hours. The cooking time may be reduced if the oat is allowed to soak overnight in water.

Flaked oats, which have been pre-steamed prior to flaking, may be cooked by placing the oats in a pot and boiling for between 2 and 10 minutes.

As porridge is generally a breakfast cereal the time taken to prepare the porridge may discourage users from using porridge as a cereal on a regular basis.

There is therefore a need for an oat or cereal based product which may be prepared without cooking simply by the addition of hot water or milk.

OBJECTS OF THE INVENTION

This invention is directed towards providing a process to prepare such an oat or indeed another cereal based product.

SUMMARY OF THE INVENTION

According to the invention there is provided a process for manufacturing a reconstitutable cereal, particularly oats comprising the steps of conditioning raw cereal having a moisture content of between 8 and 16% by weight water with water until the cereal has a moisture content below the saturation level of the cereal and between 16 and 23% by weight, cooking the conditioned cereal in an extruder cooker where it is cooked at high pressure and at a residence time of from about 10 to 120 seconds, discharging the exudate from the extruder cooker and forming it into a product of desired shape and form, and, drying the product to a moisture content of between 2 and 12% by weight.

In one embodiment of the invention the process includes the step, prior to conditioning, of forming the raw cereal into cereal flakes having a moisture content of between 8 and 16% by weight.

Preferably the moisture content of the conditioned flakes is approximately 18.5%.

Typically the exudate is cut into pellets and the pellets are formed into flakes which are then dried to a moisture content of between 2 and 12% by weight.

In a particularly preferred embodiment of the invention the processed flakes are added to a proportion, which is typically between 5 and 60% by weight, of unprocessed flakes.

Additives such as trace nutrients, vitamins, wheat flour, bran, skimmed milk powder, whey powder, or other milk by-products, malt extract, honey, sweetening agents such as sugar or aspartame, sunflower seed, vegetable oil, salt or other flavoring agents may be added to the conditioned flakes some of which may be added prior to cooking or after drying.

Preferably the flakes are cooked in the extruder cooker with a pressure at the die face sufficient to plasticise and cook the cereal product. Typically the pressure is in the range of between 10 and 210 psi.

Preferably the exudate is cut by a high speed rotating knife into small pellets or beads having a typical weight in the range of 0.05 to 0.25 gms. The pellets are then formed into flakes by pressure rolling at a temperature in the range of 5° C. to 65° C., typically approximately 45° C.

Preferably the flaked cooked oat is dried to a moisture content of between 2 and 12% by weight, typically approximately 7% water.

Typically a proportion in the range of between 5 and 60% by weight, typically 30% of enzymatically inactivated steamed and flaked oats are added to dried cooked oats.

The invention also provides reconstitutable cereal based products, particularly oat flakes whenever prepared by the process according to the invention.

ADVANTAGES OF THE INVENTION

The invention provides a readily reconstitutable cereal product, particularly oats having all the normal organoleptic properties of oats prepared in the traditional manner. The cereal product, particularly oats may be instantly reconstituted.

These and other objects and advantages of the invention will be readily apparent from the following description of some preferred embodiments thereof given by way of example only.

PRE-TREATMENT

Raw oats are de-hused, cleaned and steamed to inactivate naturally occurring enzymes. Usually the steaming process takes from between 15 to 45 minutes. The steamed oats are then passed through pressure rollers at a temperature in the range of 60° to 110° C., preferably approximately 80° C. to form oat flakes. The pressure rollers are set to produce flaked oats of a desired thickness which is preferably in the range of 0.3 to 1.5 mm, typically 0.6 mm.

CONDITIONING

Flaked oats having a moisture content of between 10 and 16% by weight, are conditioned for between 30 and 210 minutes with added water so that their moisture content is raised until it lies in the range of 16 to 23% by weight, preferably around 18.5%. Various additives may be added at this stage of the process. Such additives may include trace nutrients, vitamins, wheat, flour, bran, skimmed milk powder, whey powder, or other milk by-products, malt extract, honey, sweetening agents such as sugar or aspartame, sunflower seed, vegetable oil, salt and/or flavouring agents.

EXTRUSION COOKING

The preconditioned flake oats are then passed through a conventional single screw extruder cooker where they are cooked with an outlet temperature at the die face of approximately 95° C. The oats are cooked at a high pressure, the pressure of the die face can lie in the range of between 10 and 210 psi. The speed of rotation of the screw may be set to vary the residence time to a required value which is typically between about 10 and 125 seconds.

FLAKING

The exudate from the pressure cooker is cut by a high speed rotating knife into small pellets or beads which have a weight typically in the range of 0.05 to 0.25 gms. The pellets or beads are then conveyed to a set of pressure rollers which form the pellets or beads into flakes. The temperature at the pressure rollers is controlled to lie in the range of between 5° and 65° C., typically 45° C. The flaked cooked oat is then dried to a moisture content of between 2 and 12% by weight water, typically 7%.

The dried material is then cooled to ambient temperature. A proportion of steamed and flaked oats produced by the pretreatment step above is then added to the dried cooked processed oak flakes. The proportion of the unprocessed flakes added may be in the range of 5 to 60% by weight with a typically value of possibly 30%.

The prepared oatlets have all the normal organoleptic properties of oats which are cooked in the traditional manner. Further the oat flakes are almost identical to conventional flakes. The major advantage however is that they may be instantly reconstituted simply by the addition of hot water or milk. This not only speeds up the porridge making process but also avoids the necessity for using cooking utensils.

EXAMPLE

To 100 Kg of pre-steamed flaked oatlets is added 8 Kg of water. These are blended together for 30 minutes and allowed to condition for a further period of 45 minutes.

This material is then fed to a single screw extruder of conventional design (e.g. Wenger) having a barrel length of 1 meter. During passage through the extruder, the material is subjected to frictional and shear forces which cause the temperature to rise from ambient to a die exit temperature of 95° C. The pressure profile within the extruder also increases from normal atmospheric to a die pressure of 90 psi.

At the die face, the exudate has a moisture content of 18.5% by weight and it is cut into pellets having a weight of 0.1 g. These are conveyed to flaking rolls that are internally cooled to a temperature of 16° C. The flakes formed are dried to a moisture content of 7%, cooled and blended with 25% by weight with the original pre-steamed oatlets to yield 120 Kg of end product which was instantly reconstitutable with hot milk or hot water.

It will be appreciated that while the invention has been described with reference to a method of manufacturing reconstitutable oat flakes it is envisaged that it could possibly also be applied to the preparation of other reconstitutable cereal flakes. In the case of cereals other than oats, raw oat flakes or other raw cereals may be added.

It will also be appreciated that while the method described incorporates a single screw extruder cooker any suitable extruder cooker, such as a twin screw cooker, may be employed.

We claim:

1. A process for manufacturing a reconstitutable oat cereal comprising the steps of:
    de-husking, cleaning and enzyme inactivating raw oats;
    forming the de-husked, cleaned and enzyme inactivated oats into flakes having a moisture content of between 8% and 16% by weight;
    conditioning the oats with water until the oats have a moisture content of between 16% and 23% by weight;
    cooking the conditioned oats in an extruder cooker at a residence time of from 10 seconds to 120 seconds and at a pressure at the die face of the cooker sufficient to plasticise and cook the oats;
    discharging exudate from the extruder cooker;
    flaking the exudate; and
    drying the flaked exudate to a moisture content of between 2% and 12% by weight.

2. A process for manufacturing a reconstitutable oat cereal comprising the steps of:
    de-husking, cleaning and enzyme inactivating raw oats;
    flaking the de-husked, cleaned and enzyme inactivated oats having a moisture content of between 8% and 16% by weight;
    conditioning the oats with water until the oats have a moisture content of between 16% and 23% by weight;
    cooking the conditioned oats in an extruder cooker at a residence time of from 10 seconds to 120 seconds and at a pressure at the die face of the cooker sufficient to plasticise and cook the oats;
    discharging the exudate from the extruder cooker;
    cutting the exudate into oat pellets;
    forming the pellets into oat flakes; and drying the oat flakes to a moisture content of between 2% and 12% by weight.

3. A process as claimed in claim 2 wherein the moisture content of the oat flakes after conditioning is approximately 18.5% by weight.

4. A process as claimed in claim 1 further comprised of cutting the exudate from the extruder cooker into pellets which are formed into oat flakes which are subsequently dried to a moisture content of between 2% and 12% by weight.

5. A process as claimed in claim 4 wherein the moisture content of the processed dried oats is approximately 7% by weight.

6. A process as claimed in claim 2 further comprised of cutting the exudate by a high speed rotating knife into pellets having a typical weight in the range of from 0.05 to 0.25 grams.

7. A process as claimed in claim 5 further comprised of forming the pellets into flakes by pressure rolling at a temperature in the range of from 5° C. to 65° C.

8. A process as claimed in claim 7 wherein the temperature is approximately 45° C.

9. A process as claimed in claim 4 further comprised of adding a proportion in the range of between 5% and 60% by weight of enzymatically inactivated steamed and flaked oats, to dried cooked oats.

10. A process as claimed in claim 9 wherein the proportion is approximately 30%.

11. A process as claimed in claim 2 wherein additives are selected from the group consisting of trace nutrients, vitamins, wheat flour, bran, skimmed milk powder, whey powder, malt extract, sweetening agents, aspartame, sunflower seed, vegetable oil, and salt are added to the conditioned flakes.

12. A process as claimed in claim 11 further comprised of adding the additives prior to cooking.

13. A process as claimed in claim 11 further comprised of adding the additives after drying.

14. Reconstitutable oat flakes whenever prepared by a process as claimed in claim 1.

* * * * *